Nov. 3, 1959  G. KNIGHT, JR., ET AL  2,911,594
TRANSISTOR MEASURING METHOD AND APPARATUS
Filed Nov. 27, 1953  8 Sheets-Sheet 1

FIG. 1a.

INVENTORS
GEOFFREY KNIGHT, JR.
DAVID E. HUMEZ
RICHARD A. JOHNSON
BY Curtis, Morris & Safford
ATTORNEYS Nov. 3, 1959 G. KNIGHT, JR., ET AL 2,911,594
TRANSISTOR MEASURING METHOD AND APPARATUS
Filed Nov. 27, 1953 8 Sheets-Sheet 2

FIG. 1b.

INVENTORS
GEOFFREY KNIGHT, JR.
DAVID E. HUMEZ
RICHARD A. JOHNSON
BY Curtis, Morris & Safford
ATTORNEYS

United States Patent Office 2,911,594
Patented Nov. 3, 1959

2,911,594

TRANSISTOR MEASURING METHOD AND APPARATUS

Geoffrey Knight, Jr., Cambridge, David E. Humez, Lexington, Mass., and Richard A. Johnson, Syracuse, N.Y., assignors, by mesne assignments, to United Aircraft Corporation, East Hartford, Conn., a corporation of Delaware Application November 27, 1953, Serial No. 394,734

8 Claims. (Cl. 324—158)

The present invention is in the electrical measuring field and relates particularly to method and apparatus for measuring the properties of both point contact and junction type transistors.

Among the advantages of the described instrument embodying the present invention is the fact that it provides sufficient flexibility to measure the small-signal properties of all types of transistors in current production. Moreover, the various range adjustments in this instrument are such as to enable measurements to be made even on transistors having far wider operating ranges and higher ratings than those now in production.

In order to determine the way in which a particular transistor will behave in various circuits, the transistor may be considered as an equivalent four terminal network composed of linear elements whose values are related to the small-signal properties of the transistor, which can be measured. With the apparatus described the nine most useful small signal properties of a transistor are enabled to be measured quickly and accurately and the other properties, if desired, can then be calculated from the values of the measured properties.

Another advantage of the present invention is that it enables measurements of the most useful properties both of contact type and of junction type transistors. Another aspect of the present invention is that it provides a uniform accurate method for measuring the properties of both of these types of transistors.

Another advantage of the present invention is that it enables both the direct current and alternating current properties of both types of transistors to be measured.

A further advantage of the present invention is that it reduces the various sources of error which may tend to affect the results of such measurements.

Various other objects, aspects and advantages of the present invention will be in part pointed out and in part apparent from the following description considered in conjunction with the accompanying drawings, in which.

Figure 1A:
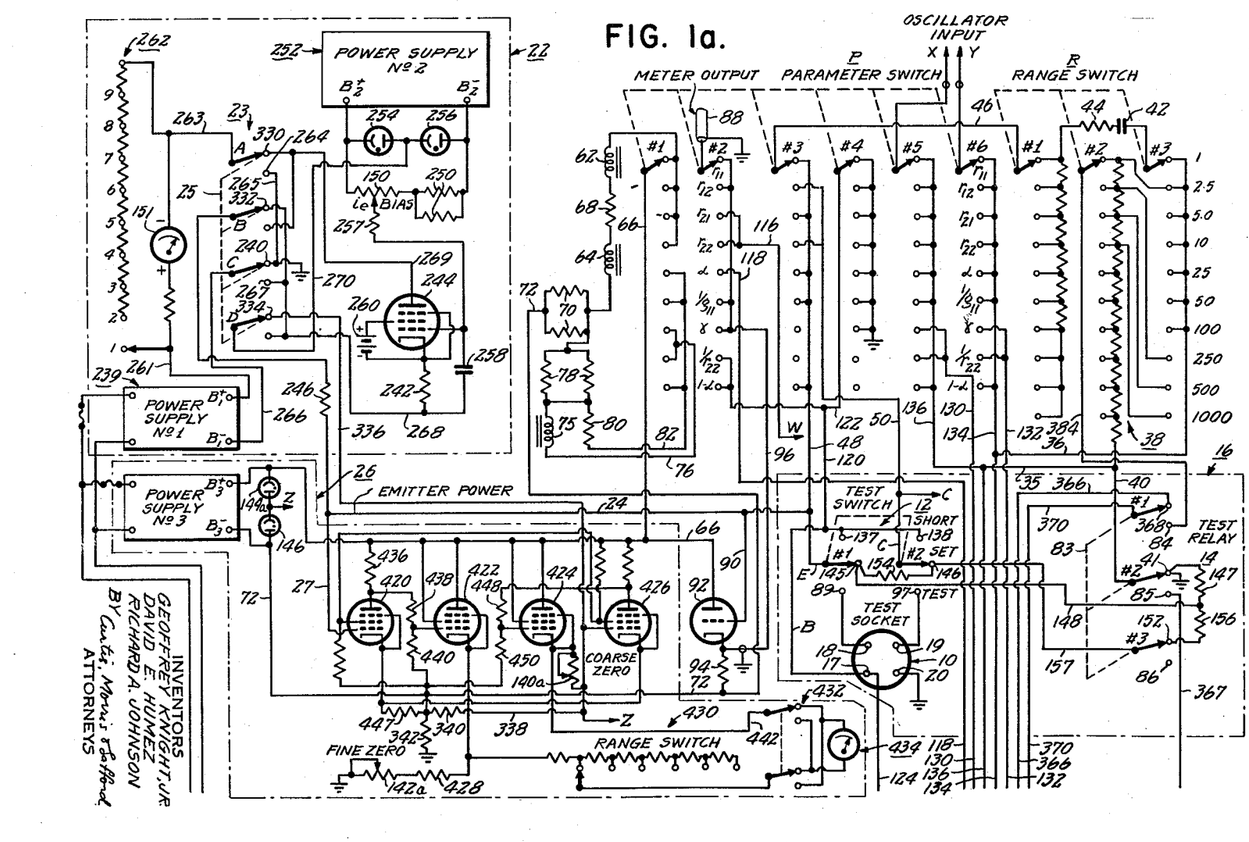
Figure 1 is a schematic circuit diagram of a portion of a commercial transistor test apparatus embodying the present invention.
Figure 1B:
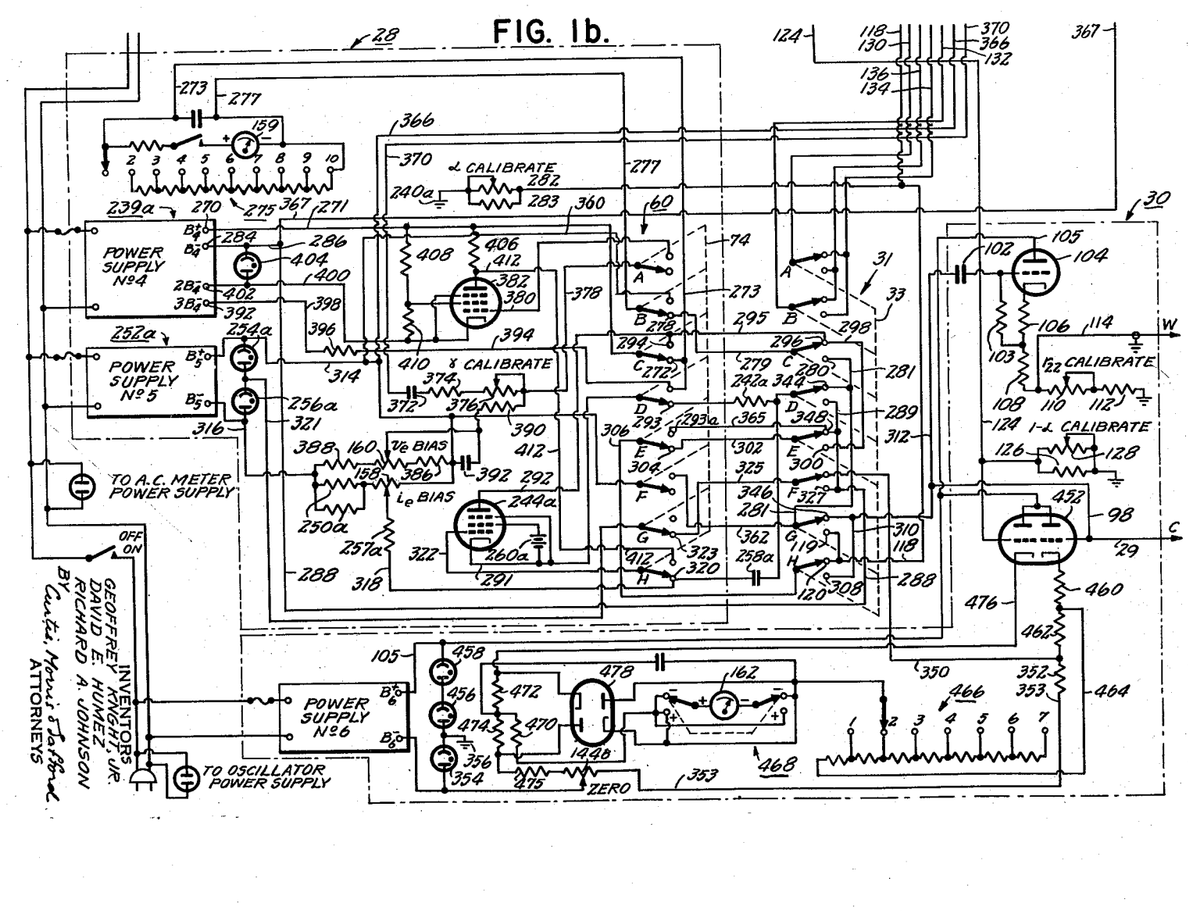
Figure 2:
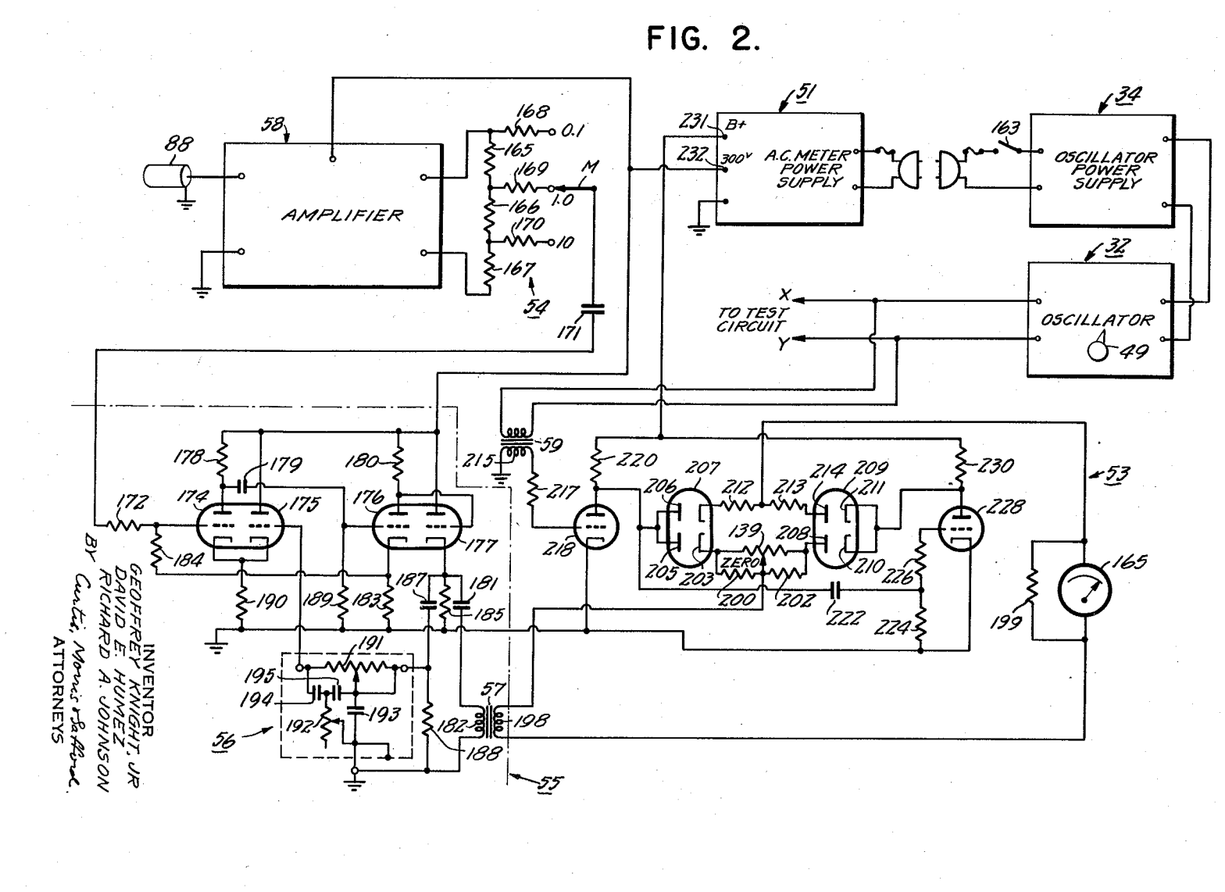
Figure 2 is a schematic circuit diagram of the remaining portion of this circuit, including an alternating current meter circuit and an oscillator, together with their power supplies.
Figure 3:
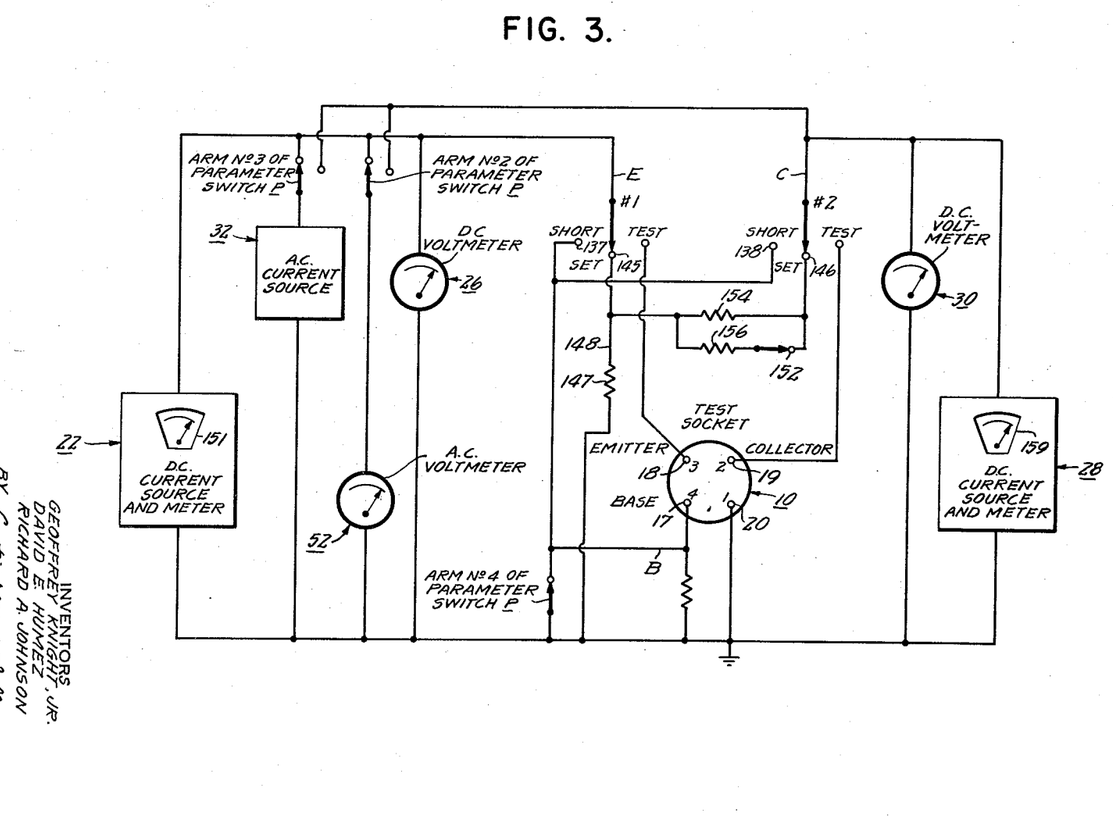
Figure 3 is a simplified schematic diagram illustrating the connections and functions of the test switch and of the various direct and alternating current sources and meters.

GENERAL DESCRIPTION (FIGURES 1, 2 AND 3)

As shown in detail in Figures 1 and 2 and as indicated partially and schematically in Figure 3, the transistor test apparatus includes a number of integrated and interrelated circuits and control switches. In operation the transistor under test is connected to a socket adapter which is plugged into a Test Socket indicated at 10. Associated with this socket is a three-position Test Switch, indicated at 12 and a three-pole-double throw relay 14, labelled Test Relay. The test socket, switch, and relay together with certain calibrating resistors and circuit leads described in detail hereinafter are included within a dotted line 16 indicating the test socket and associated elements of the instrument circuit as a whole.

The socket 10 includes four terminals numbered clockwise 17, 18, 19, and 20 of which the first three are adapted for connection to the base, emitter, and collector electrodes, respectively, of the transistor under test. Terminal 20 is connected to the common return or ground connection of the over all circuit and is adapted to be connected to a shield around the transistor, if desired.

As indicated in Figure 3, when the test switch 12 is moved to "test" position so as to connect emitter lead E to emitter socket terminal 18 and collector lead C to collector socket terminal 19, various current sources and meter circuits are connected to the emitter, collector and base of the transistor under test. The base lead B connected to base terminal 17 is connected through an arm No. 4 of a Parameter Switch P to the common return circuit.

Figure 6:
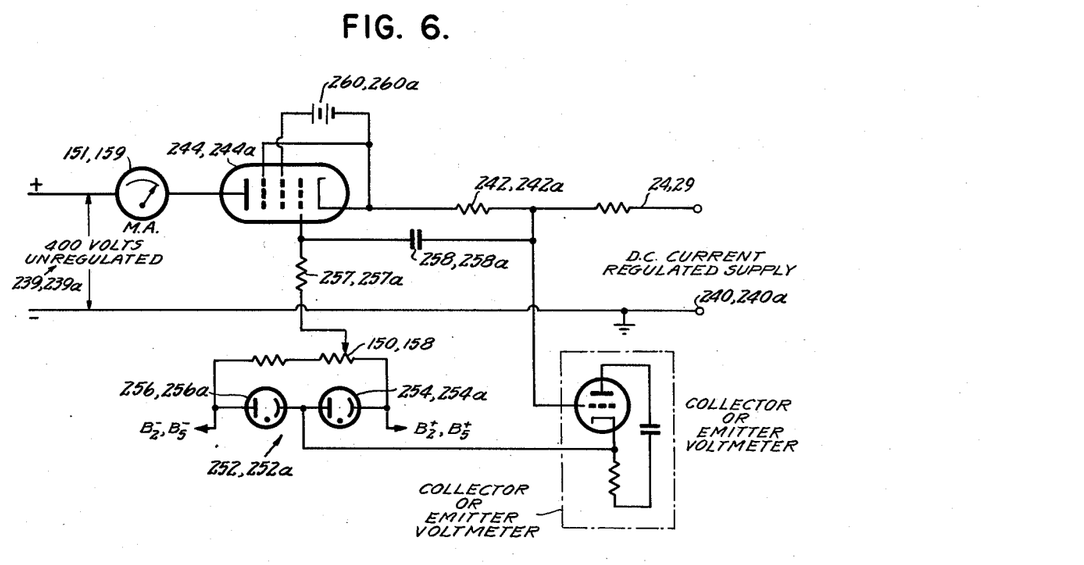
Figure 6 is a simplified schematic diagram illustrating the connections of both the emitter and collector bias current supplies when they are adjusted to provide adjustable regulated bias current at a negative voltage.
Figure 7:
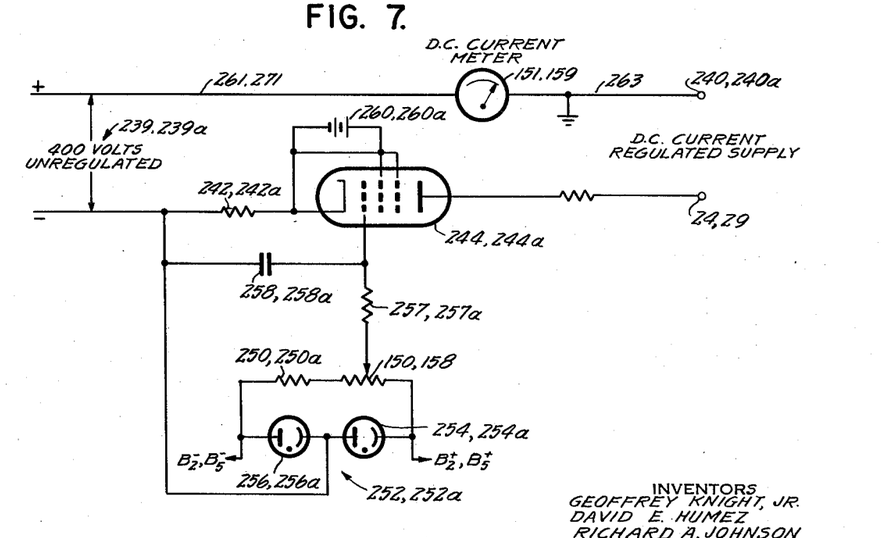
Figure 7 is a simplified schematic diagram illustrating the function of both the emitter and collector current supplies when they are adjusted to provide regulated bias current at a negative voltage.

At the left side of Figure 3 diagrammatically is shown a D.C. Current Source and Meter, generally indicated at 22, connected between lead E and the common ground circuit. The circuit arrangement of this source and meter, whose purpose is to supply a regulated bias current to the emitter socket terminal 18, is shown at the upper left side of Figure 1 included within the dotted line 22 and connected to lead E by a lead 24. Figure 6 is a simplified diagram of this bias supply 22 when switched into condition to deliver regulated current at a positive voltage with respect to the common return circuit of the apparatus. Figure 7 is a simplified diagram of supply 22 when switched to deliver regulated current at a negative voltage with respect to the common return circuit of the apparatus. The switching from positive to negative output voltage is done with a manual four-pole double-throw switch 23 shown in Figure 1, and having switch arms A, B, C, and D, from top to bottom, respectively. Switch 23 is shown in its positive voltage output position. When the handle 25 of switch 23 is moved upwardly, all of its arms move down and supply 22 is conditioned for negative voltage output.

Referring again to Figure 3 a D.C. Voltmeter, generally indicated at 26, is shown connected between the common ground circuit and lead E. The circuit arrangement of this voltmeter 26 is shown in Figure 1 within the dotted line 26, and having its input connected to lead 24 by a lead 27 so as to enable measurement of the D.C. emitter voltage.

As shown in Figure 3, a second D.C. Current Source and Meter, generally indicated at 28, is connected between the common return circuit and lead C. The circuit configuration of this source and meter, which is used to supply either current or voltage regulated bias current to the collector socket terminal 19, is shown at the left and center of Figure 1 within the dotted line 28. The lead 29 from collector bias source 28 is connected to lead C as indicated by an arrow head C at the lower right in Figure 1. The various intervening switches and connections between circuit 28 and lead C shown in Figure 1 are explained in detail hereinafter. These intermediate switches and connections as well as others associated with other portions of the apparatus have been omitted from the simplified diagram of Figure 3 for purposes of clarity of description. Figures 6 and 7 also apply to the regulated-current condition of bias source 28, which is switched from positive to negative output condition by the C, D, E, and F switch arms of a manual control switch 31 shown near the center of Figure 1. This switch is shown in its positive output condition; when its handle 33 is moved upwardly, arms C, D, E and F are swung down and source 28 supplies regulated current at a negative voltage. Switch 31 may be connected to switch 23 so that both supplies 22 and 28 are converted to a negative output at the same time.

It should be noted that source 28 can be converted into a voltage-regulated source, shown simplified in Figure 8, as explained hereinafter.

A second D.C. voltmeter circuit, generally indicated at 30, in Figure 3 connected between the common return circuit and lead C so as to measure the D.C. collector voltage is shown in full detail at the bottom and right in Figure1 within the dotted line 30. The voltmeter 30 is connected to lead C by the same lead 29 as the source 28, as indicated by arrowhead C.

An A.C. Current Source, generally indicated at 32, is shown in Figure 3 as connected from the return circuit to an arm No. 3 of switch P so as to be connectible either to lead E or lead C. This A.C. current source is the oscillator 32 (Figure 2) and its associated power supply 34, the output from the oscillator being connected to the portion of the test circuit in Figure 1 through lead X and Y (see also top of Figure 1) and then through arms Nos. 5 and 6, respectively of switch P. The oscillator output voltage is applied by leads 35 and 36 across a resistance voltage-divider 38 within a range switch R, which enables the relative strength of the A.C. signal applied to test circuit 16 to be varied in steps from 1 to 1,000. The bottom end of voltage-divider 38 is grounded to the common return circuit by a lead 40 through arm No. 2 and contact 41 of the Test Relay when its arms are in their up position as shown. The A.C. output from voltage-divider 38 to test circuit 16 passes through arm No. 3 of switch R, an isolating condenser 42, a series resistor 44, arm No. 1 of switch R; a lead 46, and arm No. 3 of the parameter switch P. As indicated in Figure 3, arm No. 3 of switch P enables the A.C. voltage to be supplied either to lead E or lead C, for some of the fixed switch contacts associated with arm No. 3 are connected by a lead 48 to lead E; others of these contacts are connected by a lead 50 to lead C. In this apparatus the oscillator is a Wein bridge oscillator advantageously arranged to produce a signal of approximately 270 cycles per second, which can be varied ±5% by the manual calibration adjustment control 49 shown diagrammatically in Figure 2.

In Figure 3, generally indicated at 52, is an A.C. Voltmeter or parameter meter which is connected from the common ground circuit through switch arm No. 2 of the parameter switch to either lead E or lead C to measure the A.C. voltage at the emitter or collector of the transistor under test. This meter is shown in detail in Figure 2 and comprises a power supply 51, a broadband amplifier 58, and a manually controlled multiplier switch 54 having three positions for adjusting the sensitivity of the voltmeter to ten times or one-tenth of its normal sensitivity, which adjustment is useful for measuring very small signal properties of junction transistors where the high sensitivity is an advantage and for noisy point-contact transistors, where the lower sensitivity is helpful. From the multiplier switch the amplified A.C. signal to be measured is fed to a tuned amplifier 55 which is tuned to the frequency of the oscillator by means of a twin-T coupling network 56 and through a transformer 57 to a phase sensitive detector and meter circuit 53 which is also coupled to the oscillator output through a transformer 59. This phase sensitive circuit is essentially responsive only to those components of the measured current or voltage which are in phase with the A.C. signal from the oscillator. Thus it excludes all random fluctuations and extraneous voltages and improves the sensitivity and accuracy of the measurements.

PARAMETER SWITCH OPERATION

The parameter switch P is a manually controlled switch having six switch arms numbered 1 through 6 and mechanically ganged together for simultaneous movement into any one of nine positions corresponding with the nine parameters which are enabled to be measured by the test apparatus. These parameters are $r_{11}$, $r_{12}$, $r_{21}$, $r_{22}$, $\alpha$, $1/g_{11}$, $\gamma$, $1/r_{22}$ and $1-\alpha$ and the respective positions of the switch P from top to bottom correspond with these parameters. The significance of these parameters and the method of their measurement is explained in detail hereinafter.

Figure 8:
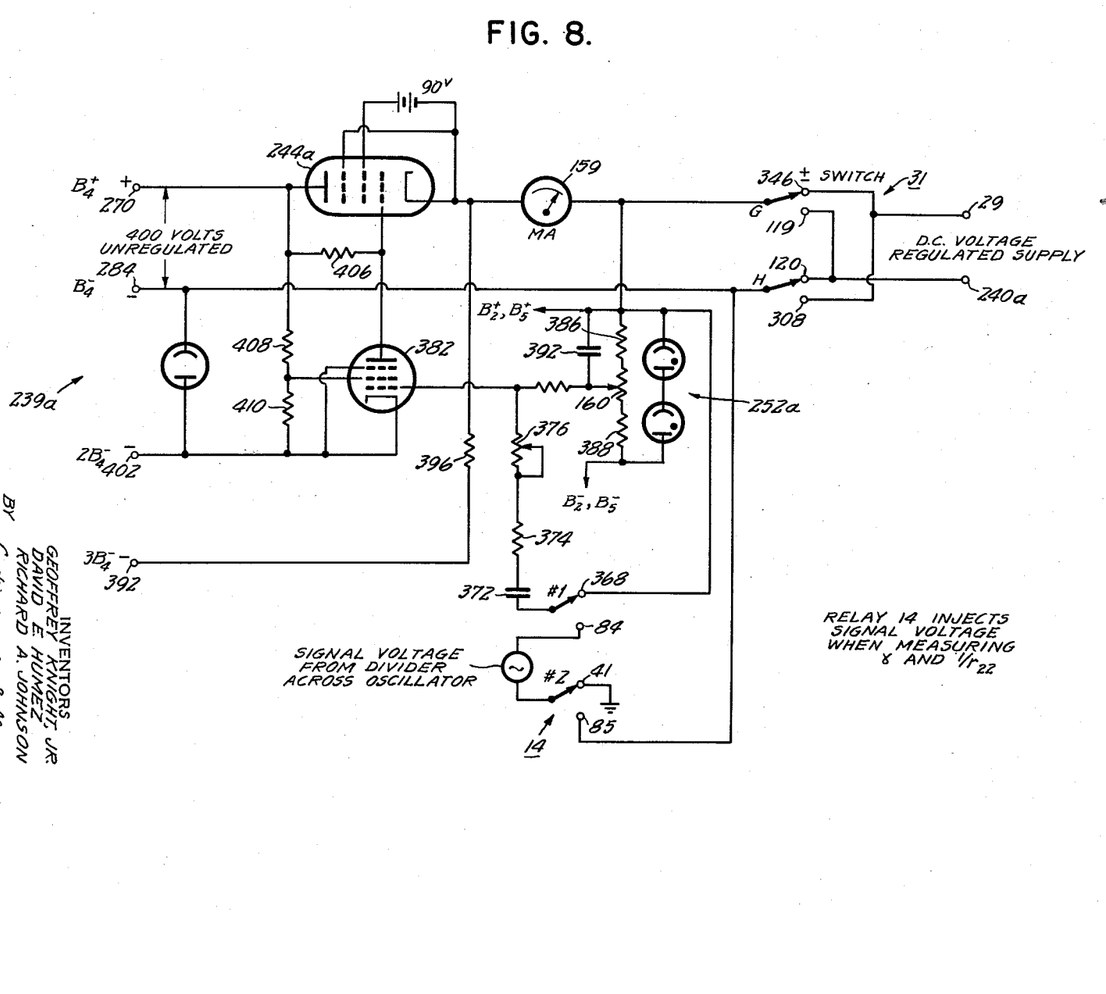
Figure 8 is a simplified schematic diagram illustrating the collector bias current supply when adjusted to supply a voltage-regulated bias to the collector.

The arm No. 1 of switch P serves to control both test relay 14 and bias supply relay 60 within the supply 28, this supply relay acting to convert the bias supply 28 from a current-regulated source as shown in Figures 6 and 7 to a voltage-regulated source as shown in Figure 8. When this arm is in any of the first four positions, called the $r_{11}$, $r_{12}$, $r_{21}$, and $r_{22}$ positions it energizes a pair of series-connected solenoids 62 and 64 which control the supply relay 60. The circuit for energizing solenoids 62 and 64 can be traced from the positive terminal of power supply No. 3 ($B_3+$) through a power lead 66, arm No. 1 of switch P to any one of the first four contacts, then through solenoid 62, series current limiting resistor 68, solenoid 64 and a pair of parallel-connected current limiting resistors 70 to the return lead 72 connected to the negative output terminal ($B_3-$) of power supply No. 3. Thus, when the parameter switch is in any of its first four positions the solenoid 62 and 64 are energized lifting the armature 74 of power supply relay 60 (shown dotted) and moving its eight arms A, B, C, D, E, F, G, and H (respectively, from top to bottom) into their lower positions, as shown, converting the collector bias supply 28 into its regulated current condition. This condition of source 28 is shown in simplified diagrammatic form in Figures 6 and 7.

As mentioned, arm No. 1 of switch P also controls the position of the test relay 14. When this arm is in its seventh and eighth positions for measuring $\gamma$ and $1/r_{22}$ respectively, a test relay operating solenoid 75 is energized. The circuit for energizing solenoid 75 passes from power supply lead 66 through arm No. 1 to the $\gamma$ and $1/r_{22}$ contacts and then through a lead 76, solenoid 75 and a pair of parallel-connected current limiting resistors 78 and resistors 70 to the return power lead 72.

Figure 5:
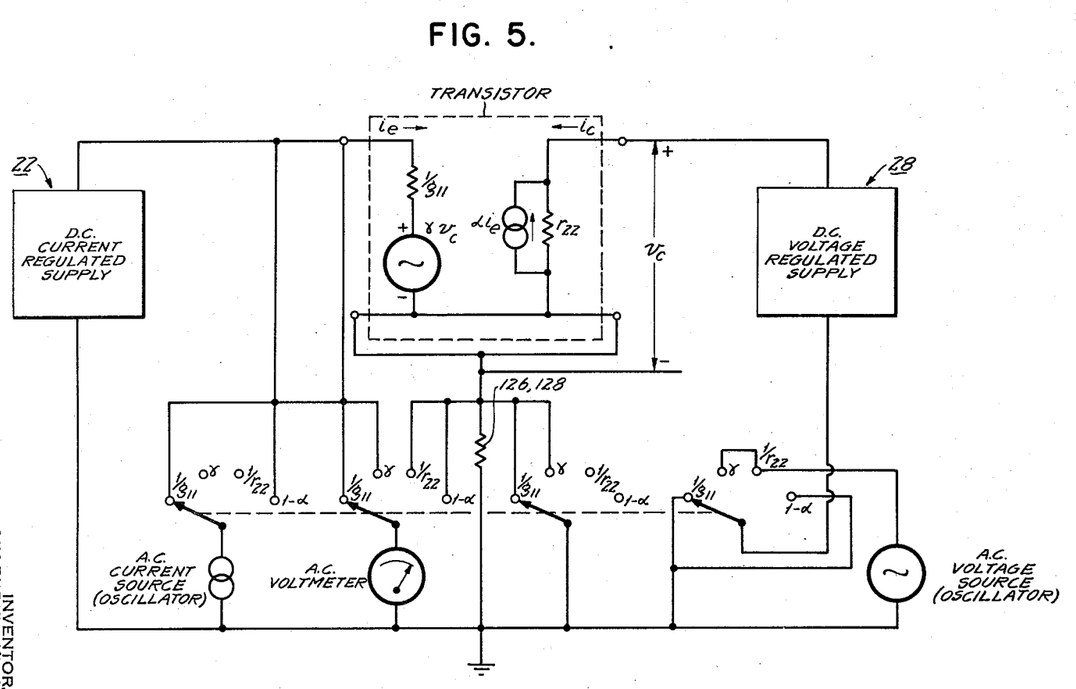
Figure 5 is a simplified schematic diagram illustrating the connections and functions of the various direct and alternating current sources and meters when the test apparatus is switched into positions for measuring the properties of junction type transistors.

Thus, with swtich arm No. 1 in its seventh and eighth positions, solenoid 75 is energized, drawing up its armature 83 (shown dotted) and engaging the test relay arms Nos. 1, 2, and 3, with the lower contacts 84, 85, and 86. This places the signal from divider 38 in series with bias supply 28, as indicated in Figure 5 for the $\gamma$ and $1/r_{22}$ positions (see also Figure 8).

When this switch arm No. 1 is in its fifth sixth, and ninth positions for measuring α, 1/g₁₁, and 1—α, respectively, all of the relay control solenoids 62, 64 and 75 are deenergized. However, in order to equalize the current drain on the carefully regulated power supply No. 3 a load resistance 80 is connected in series with resistors 70 and 78 by means of a lead 82 connected to the α, 1/g₁₁, and 1—α switch contacts. With this arrangement of relay windings and resistors, the load on supply No. 3 is the same for all nine positions of arm No. 1.

Switch arm No. 2 of switch P controls the input signal fed from the test circuit 16 to the A.C. meter circuit 52. With this arm in its first, second, sixth and seventh positions, for measuring $r_{11}$, $r_{12}$, $1/g_{11}$ and $\gamma$ the input to meter 52 is connected from emitter lead E. This circuit extends from emitter terminal 18 to the coaxial cable 88 shown at the top of Figure 1 and shown at the left of Figure 2 connected to the input amplifier 58 of meter 52. The circuit can be traced through arm No. 1 of switch 12, contact 89, lead E, lead 24, an input connection 90 to the grid of a cathode-follower triode 92 having its plate connected to the (B₃+) power supply lead 66 and its cathode connected through a cathode load resistor 94 to the (B₃—) supply lead 72. The signal from tube 92 is connected from load resistor 94 through a shielded lead 96 to the $r_{11}$, $r_{12}$, $1/g_{11}$ and $\gamma$ contacts, then through arm No. 2 of switch P and the coaxial cable 88 to meter 52. This cathode-follower stage 92 serves to minimize the effects of any stray disturbances upon the signal fed to meter 52.

When this meter is used to measure the A.C. voltage of the collector of a transistor, the circuit from the collector to this meter can be traced from socket terminal 19 through arm No. 2 of switch 12, contact 97, lead C, lead 29, leads 98 and 312. The signal is applied through an isolating condenser 102 across a grid return resistor 103, to the grid of a triode 104 connected as a cathode-follower whose function is similar to tube 92 to minimize the effects of any stray disturbances present in the connections to the meter circuit. The plate of tube 104 is connected through a power supply lead 105 to the positive (B₆+) terminal of power supply No. 6. The cathode is connected through a cathode resistor 106 to the lower end of resistor 103 and then through resistor 108 and variable and fixed load resistors 110 and 112, respectively, to the common return circuit. The output from this cathode follower stage is taken across these load resistors 110 and 112 fed through a shielded lead 114 and connection W, and then through a lead 116 to the $r_{21}$ and $r_{22}$ terminals associated with arm No. 2 of switch P.

To measure the current gain α of a transistor, the A.C. meter 52 is connected across a resistor in series with the output of bias supply 28 when it is switched into its voltage regulated condition. Tracing this connection backwards, it goes from the α contact associated with switch arm No. 2 through a lead 118 to a pair of fixed switch contacts 119 and 120 associated with switch arms G and H of a double-throw 8-pole control switch, 31. The contacts 119 and 120 (see also the simplified diagram in Figure 8) are connected to one of the return terminals 121 of the collector bias supply 28 when it is connected as a regulated-voltage supply.

In the $1/r_{22}$ and 1—α positions, the meter 52 is connected to base terminal 17 by arm No. 2 of switch P and a lead 120.

Arm No. 3 of switch P, as mentioned above, controls the application of the A.C. voltage into test circuit 16. In the $r_{11}$, $r_{21}$, α, $1/g_{11}$, and 1—α positions, arm No. 3 is connected through the lead 48 to the emitter, and in the $r_{12}$ and $r_{22}$ it is connected by the lead 50 to the collector.

Arm No. 4 of switch P serves to ground the base of the transistor in all except the $1/r_{22}$ and 1—α positions, the connection to switch arm No. 4 being from lead 120 through a lead 122. In these last two positions of the parameter switch, the base of the transistor is not grounded directly but is connected to the ground circuit by means of a resistance network within the meter circuit 30 at the lower right of Figure 1. This connection can be traced from test socket terminal 17 through a lead 124 to a fixed resistor 126 in parallel with a calibrating resistor 128 to the common circuit. As mentioned above, in these last two positions of switch P, the A.C. meter is connected by arm No. 2 through the lead 120 to the base 17. Thus, in these last two positions of switch P the A.C. meter reads the voltage across the resistive network 126, 128.

Arms Nos. 5 and 6 of the parameter switch, as mentioned above, merely connect oscillator input connections "X and Y" to the voltage-divider 38 in range switch R, and enable the oscillator input to be reversed in the γ and $1/r_{22}$ positions. In these positions arms Nos. 5 and 6 are connected by leads 130 and 132, respectively, to arms A and B of the control switch 31, so that when these arms of the control switch are in their lower positions, the oscillator input is applied in reverse phase through leads 35 and 36 to voltage-divider 38. This reverse connection is made through leads 134 and 136 connected respectively to leads 36 and 35.

METHOD OF SMALL-SIGNAL TRANSISTOR PARAMETER MEASUREMENT

Measurement of $r_{11}$, $r_{12}$, $r_{21}$, and $r_{22}$

Figure 4:
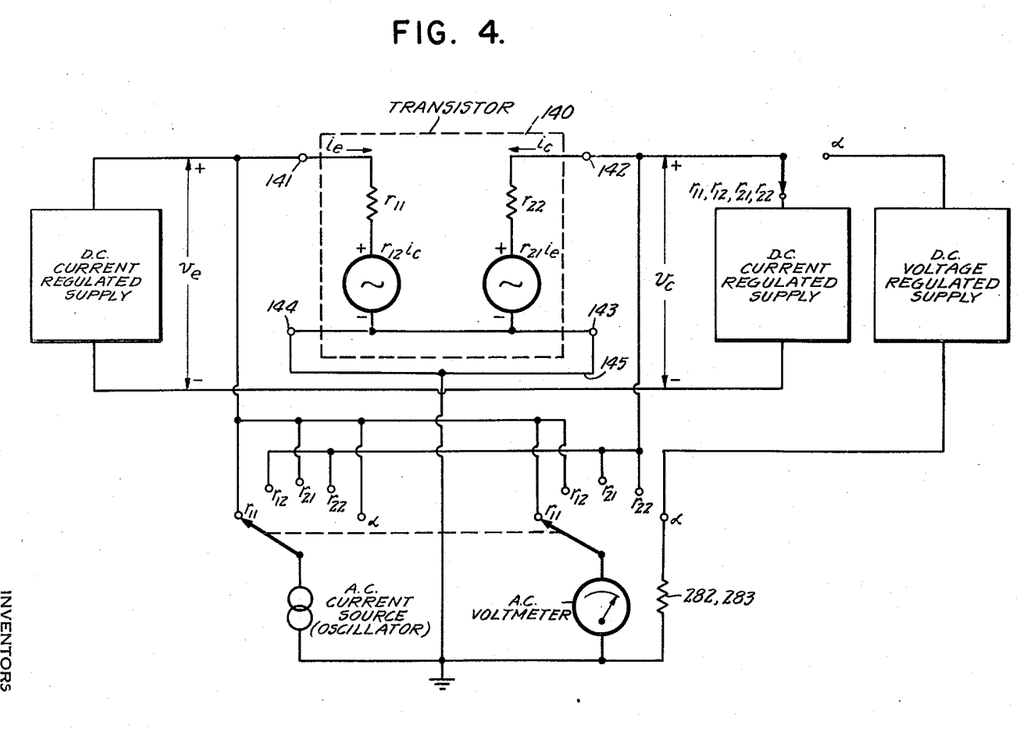
Figure 4 is a simplified schematic diagram illustrating the connections and functions of the various direct and alternating current sources and meters when the test apparatus is switched into positions for measuring the properties of point contact transistors.

For purposes of circuit analysis a transistor can be considered to be an active four terminal network. For example, referring to Figure 4, a transistor is shown as a four-terminal network 140 having terminals 141, 142, 143, and 144. Terminals 141 and 142 are the emitter and collector terminals, and terminals 143 and 144 are both connected within the transistor to its base electrode, and are connected together outside of the transistor by a common base lead 145. The applied signals and measurements are made between the emitter or collector as the case may be and the common base connection. For any such network the voltages across any two pairs of terminals and the currents flowing at those pairs of terminals are functionally related and these functions completely characterize the performance of the network. One of the six possible ways of expressing this functional relationship is shown in Equations 1 and 2 below where the capital letters designate constant values of voltage and current.

$$V_e = V_e(I_e, I_c) \quad (1)$$
$$V_c = V_c(I_e, I_c) \quad (2)$$

The curves obtained by plotting these functions with one current as the independent variable and the other as a parameter are known as characteristic curves of the network.

If the currents $I_e$ and $I_c$ make low frequency excursions about some bias values $I_{e0}$ and $I_{c0}$ as they do when a low frequency alternating signal is applied to the network, the functions $V_e$ and $V_c$ both have the form $$V(t) = V_0 + v(t) = V[I_{e0} + i_e(t), I_{c0} + i_c(t)] \quad (3)$$

where $V_0 = V(I_{e0}, I_{c0})$ and $v(t)$ and $i(t)$ are the instantaneous values of the voltage and current excursions. This function can be expanded in a Taylor's series as follows:

$$V(t) = V_0 + v(t) = V(I_{c0}, I_{c0}) + \frac{\partial V}{\partial I_e} \cdot i_e(t) + \frac{\partial V}{\partial I_c} \cdot i_c(t)$$
$$+ \frac{1}{2}\left[\frac{\partial^2 V}{\partial I_e^2} \cdot i_e^2(t) + \frac{\partial^2 V}{\partial I_c^2} \cdot i_c^2(t) + 2\frac{\partial^2 V}{\partial I_e \partial I_c} \cdot i_e(t)i_c(t)\right] + \cdots$$

$$(4)$$

where the partial derivatives are evaluated at $I_e = I_{e0}$ and $I_c = I_{c0}$.

If the current excursions $i_e(t)$ and $i_c(t)$ are so small that all the terms of this expansion of higher order than the first can be neglected, it reduces to the form:

$$v_e(t) = r_{11} i_e(t) + r_{12} i_c(t) \qquad (5)$$

$$v_c(t) = r_{21} i_e(t) + r_{22} i_c(t) \qquad (6)$$

where $$r_{11} = \left[\frac{\partial V_e}{\partial I_e}\right]_{I_c=\text{const.}, i_c=0} \qquad r_{12} = \left[\frac{\partial V_e}{\partial I_c}\right]_{I_e=\text{const.}, i_e=0}$$

$$r_{21} = \left[\frac{\partial V_c}{\partial I_e}\right]_{I_c=\text{const.}, i_c=0} \qquad r_{22} = \left[\frac{\partial V_c}{\partial I_c}\right]_{I_e=\text{const.}, i_e=0} \qquad (7)$$

are the slopes of the set of characteristic curves implicit in Equations 1 and 2.

The linear Equations 5 and 6 correspond to the diagrammatic circuit shown in Figure 4. It is apparent from this figure that $r_{11}$ is the open circuit (i.e. $i_c=0$) input (emitter) resistance and that $r_{22}$ is the open circuit (i.e. $i_e=0$) output (collector) resistance of the network. It is also apparent that $r_{12}$ is a feedback resistance whereby a current $i_c$ flowing in the output (collector) circuit generates a voltage $r_{12} i_c$ in the input (emitter) circuit, and that $r_{21}$ is a forward transfer resistance whereby a current $i_e$ flowing in the input circuit generates a voltage $r_{21} i_e$ in the output circuit.

Equations 7 show that $r_{11}$ can be determined by measuring the resulting change in the emitter voltage caused by varying the emitter current while the collector current is effectively zero. Similarly, $r_{21}$ is determined by measuring the change in the collector voltage resulting from varying the emitter current, with the collector current effectively zero. Likewise, $r_{12}$ and $r_{22}$ are determined by similar measurements with the collector current being varied and the emitter current being effectively zero.

Further below, calculations are made showing the factors by which the effectively zero conditions of the collector current or of the emitter current are obtained as the case may be.

Measurement of $g_{11}$, $\gamma$, $\alpha$, $r_{22}$

In the method of measuring $r_{11}$, $r_{12}$, $r_{21}$, and $r_{22}$, the emitter and collector currents are treated as the independent variables in the equivalent network, as shown in Figure 3. However, in some ways it is more appropriate to the nature of a transistor to consider the input (emitter) current and the output (collector) voltage to be the independent variables in the usual circuit connections. This is true from the point of view of the physics of the transistor because the parameter which is the most direct measure of transistor action, namely the current gain ($\alpha$), is defined in terms of an input current signal and a constant output voltage. It is also true from the point of view of measurement and of circuit operation because the transistor is inherently a low input resistance, high output resistance device in the most useful circuit connections. In fact, the input resistance of a transistor may be so low that the input voltage cannot be conveniently controlled whereas the output resistance may be so high that the output current cannot be conveniently controlled. As an example consider the measurement of $r_{11}$, $r_{12}$, $r_{21}$, and $r_{22}$ discussed above. In each case the dynamic resistance of the collector D.C. supply must be very much greater than $r_{22}$ if the measurement is to be accurate. However, the value of $r_{22}$ for a junction transistor may be many megohms so the resistance of the supply would have to be of the order of hundreds of megohms, which is impossible to achieve at any reasonable measuring frequency because of the effects of distributed capacity.

When $I_e$ and $V_c$ are taken to be the independent variables (see Figure 5), the functional relationship between the network voltages and currents may be written:

$$V_e = V_e(I_e, V_c) \qquad (8)$$

$$I_c = I_c(I_e, V_c) \qquad (9)$$

If the current $I_e$ and the voltage $V_c$ make sufficiently small excursions about some bias values, the Taylor's series expansions of these equations reduce to the linear relations:

$$v_e = \frac{1}{g_{11}} i_e + \gamma v_c \qquad (10)$$

$$i_c = -\alpha i_e + \frac{1}{r_{22}} v_c \qquad (11)$$

where $$\frac{1}{g_{11}} = \left[\frac{\partial V_e}{\partial I_e}\right]_{V_c=\text{const.}, v_c=0} \qquad \gamma = \left[\frac{\partial V_e}{\partial V_c}\right]_{I_e=\text{const.}, i_e=0}$$

$$\alpha = -\left[\frac{\partial I_c}{\partial I_e}\right]_{V_c=\text{const.}, v_c=0} \qquad \frac{1}{r_{22}} = \left[\frac{\partial I_c}{\partial V_c}\right]_{I_e=\text{const.}, i_e=0} \qquad (12)$$

Thus $g_{11}$, $\gamma$, $\alpha$, and $r_{22}$ are the most useful parameters when $I_e$ and $V_c$ are the independent variables.

The linear Equations 10 and 11 correspond to the circuit shown in Figure 5. Examination of this circuit shows that $g_{11}$ is the short circuit ($v_c=0$) input (emitter) conductance and that $r_{22}$ is the open circuit ($i_e=0$) output (collector) resistance. It is also seen that $\gamma$ is a voltage feedback ratio such that if a voltage $v_c$ appears across the output (collector) terminals, a voltage generator of magnitude $\gamma v_c$ appears in the input (emitter) circuit. The final parameter, $\alpha$ is seen to be the short circuit ($v_c=0$) current gain of the transistor such that if a current $i_e$ flows in the input (emitter) circuit a current generator $-\alpha i_e$ appears in the output (collector) circuit. These Equations 12 show that $1/g_{11}$ is determined by measuring the change in the emitter voltage resulting from varying the emitter current with the collector voltage held effectively at zero, and $\alpha$ is determined by the negative of the change in the collector current resulting from varying the emitter current with the collector voltage held effectively at zero. Likewise, $\gamma$ and $1/r_{22}$ are determined by similar measurements with the emitter current held at zero and the collector voltage varied.

Further below, the parameters $g_{11}$, $\gamma$, and $\alpha$ are related to $r_{11}$, $r_{12}$, $r_{21}$, and $r_{22}$ by the expressions:

$$1/g_{11} = r_{11} - \alpha r_{12}, \quad \gamma = r_{12}/r_{22}, \text{ and } \alpha = r_{21}/r_{22} \qquad (13)$$

In order to determine what factors can be used to make $I_e$, $I_c$ and $V_c$ effectively equal to zero during measurement as required by Equations 7 and 12, Equations 5 and 6 or 10 and 11 are solved.

As an example, consider the case of $r_{11}$. Solution of Equation 5 for $r_{11}$ gives:

$$r_{11} = \frac{v_e}{i_e} - r_{12} \frac{i_c}{i_e} \qquad (14)$$

Thus $r_{11}$ equals the ratio $v_e/i_e$ if the second term is so small compared with the first that it can be neglected. This will be the case if $i_c \ll -r_{11}/r_{12} i_e$, that is, if the magnitude of the collector current is very small compared with the emitter current. Now if a load resistance $r_L$ is connected between collector and base so that $v_c = -r_L i_c$, then from Equation 6:

$$i_c = \frac{-r_{21}}{r_{22} + r_L} i_e$$

so if $$\frac{r_{21}}{r_{22} + r_L} \ll \frac{r_{11}}{r_{12}} \text{ i.e. if } r_L \gg \frac{r_{12}}{r_{11}} r_{21}$$

the required condition will be established.

Similar relations can be derived for $r_{12}$, $r_{21}$, and $r_{22}$. The method, then, consists of introducing a small alternating signal current $i_e$ or $i_c$; establishing a condition, $i_c=0$ or $i_e=0$ by means of an external resistance; and measuring a small signal voltage. The value of the parameter is given by the ratio of the output voltage to the input current. Therefore, if the input current is made equal to unity, the value of the parameter is numerically equal to the output voltage.

This method can also be used to measure $1/g_{11}$, $\gamma$, $1-\alpha$, and $1/r_{22}$. The basic equations, obtained by rewriting Equations 10 and 11 and by using the relation $$i = -(i_e + i_c)$$

The necessary computations for converting from the measured parameters are seen to be easy and systematized. For example, converting to the parameters $r_e$, $r_b$, $r_c$ and $\alpha$ requires only three multiplications and two algebraic additions.

Below in Table No. 1 are shown the operating conditions for making the various measurements.

Table No. 1

| Parameter | Collector Bias | Emitter Bias | Set Input Signal [1] | Condition | Read | Full Scale Meter |
|---|---|---|---|---|---|---|
| $r_{11} = r_e + r_b$ | $\pm 0$ to 15 ma. | $\pm 0$ to 15 ma. | $i_e = \frac{200\ \mu a.[2]}{R}$ | $i_c \langle\langle \frac{r_{11}}{r_{12}} i_e \approx 0$ | $v_e$ | $R \times M$ Ohms [3] |
| $r_{12} = r_b$ | $\pm 0$ to 15 ma. | $\pm 0$ to 15 ma. | $i_c = \frac{200\ \mu a.}{R}$ | $i_e \langle\langle \frac{r_{12}}{r_{11}} i_c \approx 0$ | $v_e$ | $R \times M$ Ohms |
| $r_{21} = x(r_e + r_b)$ | $\pm 0$ to 15 ma. | $\pm 0$ to 15 ma. | $i_e = \frac{200\ \mu a.}{R}$ | $i_c \langle\langle \alpha i_e \approx 0$ | $v_c / 100$ | $10^2 R \times M$ Ohms |
| $r_{22} = r_c + r_b$ | $\pm 0$ to 15 ma. | $\pm 0$ to 15 ma. | $i_c = \frac{200\ \mu a.}{R}$ | $i_e \langle\langle \frac{1}{\alpha} i_c \approx 0$ | $v_c / 100$ | $10^2 R \times M$ Ohms |
| $\alpha = \frac{r_{21}}{r_{22}}$ | $\pm 0$ to 100 v. | $\pm 0$ to 15 ma. | $i_e = \frac{200\ \mu a.}{R}$ | $v_c \langle\langle r_{21} i_e \approx 0$ | $10 i_c$ | $10^{-1} R \times M$ |
| $1/g_{11} = r_e + (1-\alpha) r_b$ | $\pm 0$ to 100 v. | $\pm 0$ to 15 ma. | $i_e = \frac{200\ \mu a.}{R}$ | $v_c \langle\langle \frac{i_e}{\gamma g_{11}} \approx 0$ | $v_e$ | $R \times M$ Ohms |
| $\gamma = r_b / r_e + r_b$ | $\pm 0$ to 100 v. | $\pm 0$ to 15 ma. | $v_c = \frac{20\ v.}{R}$ | $i_e \langle\langle g_{11} \gamma v_c \approx 0$ | $v_e$ | $10^{-5} R \times M$ |
| $1/r_{22} = \frac{1}{r_e + r_b}$ | $\pm 0$ to 100 v. | $\pm 0$ to 15 ma. | $v_c = \frac{20\ v.}{R}$ | $i_e \langle\langle \frac{v_e}{\alpha r_{22}} \approx 0$ | $1{,}000 i_c$ | $10^{-6} R \times M$ Mhos |
| $1 - \alpha$ | $\pm 0$ to 100 v. | $\pm 0$ to 15 ma. | $i_e = \frac{200\ \mu a.}{R}$ | $v_c \langle\langle (1-\alpha) r_{22} i_e \approx 0$ | $1{,}000 i_b$ | $10^{-3} R \times M$ |

[1] Impedances of D.C. current sources are greater than 5 megohms. Impedance of signal current source—$10^5 \times R$ ohms (to a max. of 10 meg). Impedance of signal (and D.C.) voltage source is less than 15 ohms.
[2] R denotes the value of the range switch and has the positions 1.0, 2.5, 5.0, 10, 25, 50, 100, 250, 500, and 1000.
[3] M denotes the value of the meter multiplier switch and has positions 0.1, 1, and 10.

are:

$$v_e = \frac{1}{g_{11}} i_e + \gamma v_c \quad (15)$$

$$i_c = -\alpha i_e + 1/r_{22} v_c \quad (16)$$

$$i = -(1-\alpha) i_e - 1/r_{22} v_c \quad (17)$$

These equations can be solved so as to express each of the parameters in terms of a ratio of output signal to input signal plus a term which can be made so small as to be negligible by a suitable resistance in the external circuit, in a manner similar to that shown above. The apparatus described automatically obtains the desired conditions for making these measurements when used in accordance with table I below, as shown in the "Condition" column, where the desired independent variable, is effectively zero.

An advantage of this instrument is that in accordance with the invention it enables the measurement of $\alpha$, $\gamma$, $1/g_{11}$, $1/r_{22}$ and $1-\alpha$ for point contact and junction-type transistors. These quantities are defined above and provide a more convenient set of parameters for circuit analysis than the emitter resistance, base resistance, collector resistance and mutual resistance which are now used.

Equations for converting from the measured parameters are given below:

$$r_e = r_{11} - r_{12} = 1/g_{11} - (1-\alpha) \gamma r_{22}$$
$$r_b = r_{12} = \gamma r_{22}$$
$$r_c = r_{22} - r_{12} = (1-\gamma) r_{22} \cong r_{22}$$
$$r_m = r_{21} - r_{12} = (\alpha - \gamma) r_{22} \cong \alpha r_{22}$$
$$\alpha = \frac{r_{21} - r_{12}}{r_{22} - r_{12}} = \frac{\alpha - \gamma}{1 - \gamma} \cong \alpha$$

The approximations on the extreme right side are excellent, for $$\gamma \ll 1,\ \alpha \gg \gamma\ \text{and}\ \gamma \ll 1,\ \gamma \ll \alpha$$

for a satisfactory transistor.

METER ZEROING AND CALIBRATION OF A.C. METER

In order to adjust the meter zero positions, arms No. 1 and No. 2 of the switch 12 are moved up into Short position, in which they touch contacts 137 and 138, respectively, and the parameter switch is moved up to any one of the top four positions. With switches P and 12 in these positions, all of the A.C. and D.C. supplies have their outputs short-circuited as readily seen in the simplified diagram in Figure 3, so that the input voltage to all of the voltmeters is zero. Thus, the operator is readily enabled to adjust the "zero" of the A.C. meter 52 and of the emitter and collector D.C. meters 28 and 30, respectively. The "zeroing" of the A.C. meter is done by means of the variable resistance 139 (Figure 2) in the phase detector circuit. The zero adjustment of the emitter D.C. meter 26 is set by the variable resistance 140a providing a coarse zero adjustment and the resistor 142a providing a fine zero adjustment. And the zero of the collector D.C. meter 30 is adjusted by the variable resistor 144b.

In the bottom five positions of the parameter switch, the collector bias source 28 is voltage regulated, so that large D.C. currents are likely to flow from source 28 through lead C to the common ground circuit if the test switch is thrown into short position with switch P in these positions. Therefor, the customary operation is always to turn the parameter switch to the $r_{11}$ position when "zeroing" the three meters.

With the meters "zeroed" the test switch is moved to its Set position for calibration of A.C. meter 52 and for setting the desired values of the bias currents from sources 22 and 28. In its Set position arms Nos. 1 and 2 touch contacts 145 and 146, respectively, as shown in Figures 1 and 3. A dummy load resistor 147 is connected to ground from lead E, the connection passing through arm No. 1, contact 145, a lead 148, resistor 147, contact 41 of relay 14 to ground. The desired value of emitter D.C. bias current flowing through dummy resistor 147 is set by means of the $I_e$ bias potentiometer 150 in source 22, the value of this current being read on meter 151.

Assuming that switch P is not in $\gamma$ or $1/r_{22}$ position, relay 14 is unenergized and its arm No. 3 engages contact 152 so that dummy load resistors 154 and 156 are connected in parallel by leads 148 and 157 between leads E and C to provide a dummy emitter to collector load through which the desired value of collector bias from source 28 is established by adjusting $I_c$ bias potentiometer 158 and reading meter 159.

With the test switch still in Set position and switch P in either the $\gamma$ or $1/r_{22}$ positions, relay 14 is energized, disengaging arm No. 3 from contact 152 so that only dummy resistor 154 is connected between leads E and C. Advantageously this resistor has 100 times the resistance value of resistor 156. This higher resistance is more suited for setting the emitter-current and collector voltage bias values for these two measurements. The collector voltage bias is adjusted by a $V_e$ bias potentiometer 160, its value being read on meter dial 162 in meter circuit 30.

When the desired values of bias have been set, the test switch is thrown to Test position and the bias supplies and metering circuits are connected directly to the terminals of the test socket 10 for measurement of the transistor characteristics.

MEASUREMENT OF TRANSISTOR D.C. CHARACTERISTICS

The D.C. or static characteristics of the transistor under test are obtained by observing the D.C. (static) values of two dependent quantities as two independent quantities are varied. With switch P in the $r_{11}$, $r_{12}$, $r_{21}$ or $r_{22}$ positions, the independent quantities are the emitter and collector currents which are varied in any desired manner by $I_e$ and $I_c$ potentiometers 150 and 158, respectively. The dependent quantities are then emitter and collector voltages, depending on the characteristics of the transistor.

In the $\alpha$, $1/g_{11}$, and $\gamma$ positions of switch P, emitter current and collector voltage are the independent quantities, and emitter voltage and collector current depend on the transistor characteristics.

D.C. measurements are not made in the $1/r_{22}$ and $1-\alpha$ positions because resistors 126, 128 are connected between the base terminal and the ground circuit for measurement of these A.C. parameters, as mentioned previously.

It is common for the D.C. specifications of point contact transistors to include one or more points along both the cutoff and saturation curves. Points along the cutoff curve (along which the emitter current is zero) are conveniently measured in the $\alpha$ position since collector current at fixed collector voltage is desired. Points along the saturation curve are measured in any of the first four positions of switch P, for collector voltage at fixed collector current (and emitter current) is required.

In measuring the D.C. properties, instead of setting the desired bias values by using the dummy load resistors and then throwing the test switch to Test positions, which is the procedure described above, the current or voltage values may be gradually applied directly to the transistor under test.

With this procedure, the $I_e$, $I_c$, or $V_c$ potentiometer 150, 158, and 160, respectively, are first set to minimum position, switch 12 is then thrown to Test position, and the values of current or voltage, as the case may be, are gradually increased to their desired readings by adjusting potentiometers 150, 158, or 160.

With either procedure, the desired polarity of the bias sources, is first established by setting switch 23, as discussed above. Since D.C. characteristics are being measured, the oscillator power supply is shut off by its switch 163.

These same static characteristic measurements can be made on junction transistors using either of the above procedures.

The parameter switch should not be changed from $\alpha$ to $r_{22}$ position (or vice versa) with switch 12 in Test position since the collector source 28 is then changed from a current to a voltage regulator supply (or vice versa) and severe transient fluctuations are likely to occur. The test switch is first placed in Set position before switching between $\alpha$ and $r_{22}$.

MEASUREMENT OF TRANSISTOR SMALL-SIGNAL A.C. CHARACTERISTICS

In order to measure the small signal A.C. characteristics, the oscillator is turned on by switch 163 and the parameter switch is moved to the desired parameter. With switch 12 in Test position, the values of the parameter are determined from the readings on meter dial 164 in the A.C. meter circuit. For all positions of the parameter switch the full-scale readings on dial 164 are equal to the actual reading times the setting of the sensitivity multiplier switch (i.e. 0.1, 1.0, or 10) times the setting of the range switch (i.e. 1 to 1,000).

With the desired parameter selected, bias current or voltage is applied to the transistor by either of the methods described under D.C. measurements. The settings of the range and multiplier switches are made with power applied to the transistor.

The most sensitive multiplier (0.1) is not often used for measurements on point contact transistors because the transistor noise may cause excessive fluctuations in the reading of meter dial 165. For average point contact transistors the normal multiplier (1.0) is used, and for very noisy transistors, measurements may be made with a multiplier of 10 and with larger signal values by setting the range switch to a larger value.

In measuring junction transistors, the most sensitive multiplier is often used, particularly for measuring $\gamma$ and $1/r_{22}$ at low bias values.

A.C. METER CIRCUIT DETAILS

The A.C. meter circuit shown in Figure 2 includes the first broad band amplifier 58 which has a gain of 100 stabilized by suitable feedback and is coupled to the tuned amplifier 55 through the multiplier switch 54. This multiplier switch has three resistances 165, 166, and 167 in series from top to bottom across the output of amplifier 58 with switch contact positions 0.1, 1.0, and 10 connected to the respective top ends of resistors 165, 166, and 167 through resistors 168, 169, and 170. From the multiplier switch arm M the amplified signal is coupled through condenser 171 and resistor 172 to the input of the tuned amplifier 55.

Amplifier 55 includes four triodes 174, 175, 176, and 177 in two envelopes. The signal on the grid of the first triode 174 is amplified and fed from a load resistor 178 through a condenser 179 and across a grid-return resistor 189 to the grid of an intermediate triode 176 whose load resistor 180 is directly connected to the grid of the last triode 177, connected as a cathode follower, through condenser 181 to the primary 182 of output transformer 57. A negative feedback path from the cathode resistor 183 of intermediate triode 176 through a resistor 184 to the grid of the first triode 174 stabilizes the voltage gain of amplifier 55 at 100, which is determined by the ratio of the resistance values of plate resistor 180 and cathode resistor 183.

A second feedback path from the cathode resistor 185 of the last triode 177 through a condenser 187, across a grounded resistor 188 and through the twin T coupling network to the grid of the second triode 175 is provided, being degenerative at frequencies remote from the null frequency of network 56, which is 270 c.p.s. Triode 175 is cathode coupled to the input triode 174 by a common cathode resistor 190.

The twin T network comprises a first T network having a potentiometer resistor 191 connected from input to output and with its sliding contact connected to the A.C. meter ground circuit through a condenser 193. The second T network comprises a pair of condensers 194 and 195 connected in series from input to output and having their common terminals connected to ground through a variable resistor 192.

Advantageously, the net result is that amplifier 55 has a maximum gain of 100 at 270 c.p.s. and a selectivity equivalent to a single tuned circuit with a Q of 12 so as to reject any extraneous signals and improve the accuracy and sensitivity of the meter circuit.

The secondary 198 of the output transformer 57 is connected between a terminal of the meter 165 which may have a suitable by-pass resistor 199 and the sliding contact of "zeroing" potentiometer 139, which is connected to opposite ends of this potentiometer by resistors 200 and 202. One end of potentiometer 139 is connected to a cathode 203 of a dual diode 207 whose plates 205 and 206 are connected together, and the other end is connected to a plate 208 of another dual diode 209 whose cathodes 210 and 211 are connected together to form a bridge circuit. The other cathode of tube 207 is connected through a resistor 212 in series with a resistor 213 to the other plate 214 of tube 209. The other terminal of meter 165 is connected to the opposite side of the diode bridge circuit at the junction of resistors 212 and 213.

The reference voltage from oscillator 32 is fed from the secondary 215 of transformer 59 through a grid leak resistor 217 to the grid of an over-driven triode 218 having a plate-load resistor 220. The signal on the plate of triode 218 is coupled through a condenser 222 to the junction of resistor 224, whose other end is grounded to the common meter circuit, and resistor 226, which is connected to the grid of a second triode 228. The plate load resistor 230 of triode 228 and resistor 220 are both connected to the higher voltage B+ terminal 231 of the A.C. meter supply 51, while the two amplifiers 53 and 55 receive their plate voltage from the better filtered 300 volt terminal 232.

The operation of the phase detection circuit causes the diode tubes 207 and 209 to be biased off by approximately 100 volts during the half cycle when the grid of triode 218 is driven positive and the grid of triode 228 is driven negative by the reference signal from the oscillator. During the other half cycle when the voltages on the grids of triodes 218 and 228 are reversed, the diodes conduct about 5 milliamperes and the amount of current through the meter 165 then depends upon the magnitude and phase of the signal applied by the secondary 198 to the diode bridge circuit.

Signals in phase with the oscillator reference signal unbalance the bridge and deflect meter 165. Signals 90° out of phase with the oscillator give rise to equal positive and negative currents during the half cycle when the diodes are conducting so that no net deflection occurs. Similarly, random noise voltages and stray 60 cycle pickup produce no average deflection. The result of the phase detection action is that this A.C. meter circuit has a bandwidth equal to that of the pivoted meter movement in meter 165 considered as a low pass filter, thus producing an accurate sensitive reading without undue meter fluctuations.

NEGATIVE CURRENT REGULATED SUPPLIES

In Figure 7 is shown the connections for both sources 22 and 28 when connected to supply regulated current at a negative voltage, obtained by moving handles 25 and 33 of switches 23 and 31, respectively, upwardly to swing their contact arms down.

As shown in Figure 7, which is simplified by the omission of the various switches, and in which double reference numerals are used since it represents both bias current circuits 22 and 28, the negative supplies comprise an unregulated source of voltage, here shown as approximately 400 volts, indicated at 239, 239a, having its positive side connected through a meter 151, 159 to a common ground connection 240, 240a which serves as the grounded side of the regulated output. The negative side of the unregulated voltage source is connected through a 10,000 ohm cathode resistor 242, 242a to the cathode of a pentode 244, 244a. The plate of the pentode supplies the regulated current at a negative potential to an output connection 24, 29. This pentode may be a 6AG7, which in this circuit presents an impedance of about 10 megohms at terminal 240, 240a so as to be essentially a constant current source. The desired current values are set by a potentiometer 150, 158 connected in series with a resistor 250, 250a across the output of a voltage source 252, 252a having its output regulated by a pair of voltage regulator tubes 254, 254a and 256, 256a connected in series across its output. The slider on the potentiometer is connected through a resistor 257, 257a to the grid of the pentode, the common connection between the voltage regulator tubes being returned to the negative terminal of the unregulated source 239, 239a. A condenser 258, 258a is connected between the cathode and grid of the pentode to prevent rapid fluctuations in the potential of the grid relative to the cathode.

The suppressor grid is connected to the cathode, while the voltage for the screen of the pentode is obtained from a 90 volt battery 260, 260a connected between the cathode and screen.

In operation the potentiometer 150, 158 and resistor 250, 250a act as a voltage divider across the output of the source 252, 252a so as to establish the grid of the pentode at a fixed but adjustable potential with respect to the cathode, thus regulating the current output at terminals 240, 240a, and 24, 29 while maintaining a very high impedance there as desired.

Reference is now made to emitter bias circuit 22 in Figure 1 for the details of one of the sources diagrammatically shown in Figure 7. The contact arms A, B, C, and D of switch 23 are in down position for negative output. Thus, the positive terminal (B₁+) of Power Supply No. 1, reference numeral 239, is connected by a lead 261 through meter 151, shunted by a nine-position range switch 262, and through a lead 263 to contact arm A of switch 23. Arm A is engaging its lower contact 264 connected by a lead 265 to a switch contact 240 which is grounded and forms one output terminal of the regulated source.

The negative terminal (B₁—) of source 239 is connected through a lead 266 and contact arm C of switch 23 to a switch contact 267 connected by a lead 268 to the cathode resistor 242. The plate of tube 244 is connected through a lead 269 and switch arm B through resistor 246 to the lead 24 forming the other output terminal of the source 22. Power Supply No. 2 is the voltage source 252 shown in Figure 7, and the resistance 250 comprises resistors 250 in parallel. The connection from the common terminals of voltage regulator tubes 254 and 256 to resistor 242 is made through a lead 270 and switch arm D of switch 23 and lead 268.

Reference is now made to collector bias circuit 28 for the details of the other source represented by Figure 7.

The contact arms of relay 60 are in down position making circuit 28 current regulated, and the contact arms of switch 31 are in up position with handle 33 down, making the output negative. The positive terminal 270 (B+4) of the Power Supply No. 4, reference numeral 239a, is connected through a lead 271, contact arm C of relay 60, contact 272 and lead 273 to meter 159 having a range switch 275 in shunt, providing a total of nine ranges for current measurement. From the other terminal of meter 159 connection is made through a lead 277, arm B of relay 60, contact 278, a lead 279, arm C of switch 31, contact 280, a lead 281, arm G of switch 31, the contact 119, lead 118, through a resistance network including an α-Calibrate variable resistor 282 in parallel with a resistor 283 to ground at 240a which forms one terminal of the source 28 as a current source.

The connection to the base terminal 17 for source 28 as well as for source 22 is through the parallel resistors 126 and 128 and through lead 124 when the parameter switch is in $1/r_{22}$ and $1-\alpha$ positions. Otherwise the base terminal 17 is grounded by arm No. 4 of switch P so that resistors 126 and 128 are short circuited. The resistors 126 and 128, resistors 282 and 283 and resistor 246, in series in the current leads of sources 22 and 28 are not shown in the simplified diagram in Figure 7 for their small resistance and effect on the circuits is insignificant compared with the 10 megohms provided by tubes 244 and 244a.

One of the negative terminals 284 of supply 239a is connected to the cathode of tube 244a through a lead 286, a lead 288, a lead 289, a contact 290 of switch 31, arm D, cathode resistor 242a, arm D and contact 293 of relay 60 and a lead 291 to the cathode of tube 244a.

The connection from the plate of tube 244a to the collector lead 29 passes through a lead 292, a contact 294 of relay 60, a jumper lead 295, a contact 296 of switch 31, a lead 298, a contact 300 and arm E of switch 31, a lead 302, a contact 304 and arm E of relay 60, a lead 306 to arm H and contact 308 of switch 31, a lead 310, a lead 312, lead 98, and lead 29 to the collector lead C. As in the case of tube 244, the suppressor grid of tube 244a is connected to the cathode and the screen is connected to the cathode through a 90 volt biasing battery 260a.

The grid voltage for tube 244a is obtained from Power Supply No. 5 which is the source 252a shown in Figure 7 and having a pair of voltage regulator tubes 254a and 256a in series across its output between its positive terminal ($B^+_5$) and its negative terminal ($B^-_5$). This positive terminal ($B^+_5$) is connected through a lead 314 to one end of the $I_c$ bias potentiometer 158, whose other end is connected through parallel resistors 250a and a lead 316 to the negative terminal ($B^-_5$). The movable contact of potentiometer 158 is connected through a resistor 257a, a lead 318, contact 320 and arm H of relay 60, and a lead 322 to the grid of tube 244a. The condenser 258a is connected between the grid and cathode resistor 242a of tube 244a by the lead 322, arm H and contact 320 of relay 60. The common connection between voltage regulator tubes 254a and 256a is connected to the cathode resistor 242a by a lead 321, arm G and contact 323 of relay 60, a lead 325, arm F and contact 327 of switch 31, the lead 289, arm D of switch 31 to resistor 242a.

POSITIVE CURRENT REGULATED SUPPLIES

When the contact arms of switches 23 and 31 are moved up, both bias current sources 22 and 28 become positive current regulated supplies as shown diagrammatically in the simplified circuit in Figure 6, which represents both bias current sources so double reference numerals are used. The positive terminal of 400 volt source 239, 239a is connected through meter 151, 159 to the plate of pentode 244, 244a. The cathode of this tube is connected through cathode resistor 242, 242a to one of the output connections 24, 29. The negative terminal of source 239, 239a is connected to a ground output connection at 240, 240a.

The voltage for the grid of tube 244, 244a is obtained from source 252, 252a in the same way as when used for negative current regulated output, as described in the preceding section, except that the common terminal between the voltage regulator tubes 254, 254a and 256, 256a is returned to a low impedance in the D.C. meter circuit associated with the bias source, as explained hereinafter. The connections of this arrangement have the advantage of minimizing any capacity in shunt with the output connections 24, 29 and 240, 240a.

The operation of the positive current regulated supplies are similar to that of the negative ones, the voltage on the grid of tube 244, 244a being set by the bias potentiometer 150, 158 which regulates the amount of bias current.

Reference is made to circuit 22 for details of the emitter bias current source when used as a positive source. The contact arms A, B, C, and D of switch 23 are in up position as shown so that the meter lead 263 is connected through arm A and contact 330 and the lead 269 to the plate of tube 244. Its cathode resistor 242 is connected through lead 268, contact 332 and arm B of switch 23, and resistor 246 to the connection 24 to emitter lead E. The negative terminal ($B^-_1$) of supply 239 is grounded by lead 266, switch arm C and grounded switch contact 240. The junction of voltage regulator tubes 254, 256 is connected through a lead 270, arm D and contact 334 of switch 23, a lead 336, a lead 338, and resistors 340 and 342 in the emitter D.C. voltmeter circuit to the common return circuit.

Reference is made to collector bias current circuit 28 in Figure 1 to explain its connections when used as a positive current regulated supply. Relay 60 is energized, lowering all of its arms as shown and the arms of switch 31 are up, as shown.

The positive terminal 270 of supply 239a is connected through lead 271, arm C and contact 272, lead 273, meter 159, lead 277, arm B, contact 278, lead 279, arm C and contact 296 of switch 31, jumper lead 295, contact 294, and lead 292 to the plate of tube 244a. The output from the cathode of tube 244a is fed through lead 291, arm D and contact 293 of relay 60, cathode resistor 242a, arm D and contact 344 of switch 31, lead 281, arm G and contact 346 of switch 31, lead 312, leads 98 and 29 to collector lead C.

The negative terminal 284 of supply 239a is connected to ground through lead 286, lead 288, lead 289, a contact 348 and arm E of switch 31, lead 302, contact 304 and arm E of relay 60, lead 306, arm H and contact 120 of switch 31, lead 118, and resistors 282 and 283 to ground at 240a. Condenser 258a is connected between the grid of tube 244a and cathode resistor 242a by lead 322, arm H and contact 320 of relay 60. The common connection between voltage regulator tubes 254a and 256a is connected into the D.C. emitter voltmeter circuit 30 by a lead 321, arm G and contact 323 of relay 60, lead 325, arm F of switch 31 and its upper contact, a lead 350, a resistor 352, a lead 353, the potentiometer 144 and its sliding contact, a voltage regulator tube 354, to the common return circuit at 356.

VOLTAGE REGULATED COLLECTOR SUPPLY

Collector bias circuit 28 is converted to a voltage regulated supply, as shown simplified in Figure 8, when the relay 60 is deenergized and its contact arms swing up. In this circuit the plate of pentode 244a is connected directly to the positive terminal 270 of source 239a through lead 292, contact 294, arm C of relay 60, through lead 271 to terminal 270. The cathode of tube 244a is connected through lead 291, arm D of relay 60 and its upper contact, lead 273, meter 159, lead 277, arm B of relay 60 and its upper contact, a lead 360, arm F of relay 60 and its upper contact, a lead 362 to arm G of switch 31. When arm G is up, the voltage output is positive, passing through contact 346, and leads 312, 98 and 29 to the collector lead C. When arm G is down, the output is negative, for the connection is through contact 119, lead 118, and resistors 282 and 283 to ground at 240a.

These resistors 282 and 283 are in series with the collector voltage supply as shown diagrammatically in Figure 4 to enable measurement of the collector A.C. current when in the α position. The potentiometer 282 provides the α calibrating adjustment and has a maximum resistance of only 10 ohms. The impedance of source 28 as a regulated voltage source is less than 5 ohms so that including resistors 282 and 283 the maximum impedance of the regulated voltage circuit is less than 15 ohms.

A connection between the output side of meter 159 (see Figure 8) and the positive terminal (B+5) of supply 252a passes from lead 277, arm B of relay 60 and its upper contact, the lead 360, and the lead 314. Lead 314 is connected by a lead 366 to a contact 368 associated with arm No. 1 of relay 14. This arm is connected by a lead 370 to a coupling condenser 372 connected through a resistor 374 in series with a γ-calibrating variable resistor 376, a lead 378, arm A of relay 60 and its upper contact, a lead 380 to the grid of a pentode 382.

The negative terminal 284 of supply 239a is connected to arm H of switch 31 and to contact 85 of test relay 14. The circuit to arm H passes through the lead 286, lead 288, lead 289, contact 348, jumper lead 365, contact 293a and arm E of relay 60, and lead 306 to arm H. Arms G and H are ganged with the other arms of switch 31 so that a single handle 33 can always be used to set the polarity of the collector voltage. The connection from supply terminal 284 to contact 85 of test relay passes through lead 286 and a lead 367. Thus, when measuring γ and $1/r_{22}$, when relay 14 is energized, a signal from voltage divider 38 is injected into the regulated voltage supply. This A.C. signal is fed from divider 38 through lead 40 to contact 85 and from arm No. 2 of the range switch through a lead 384 to contact 84 so as to be applied between terminal 284 of supply 239a and the grid of tube 382 to slightly modulate the output voltage to the collector.

The grid of tube 382 is held at a fixed adjustable voltage with respect to the cathode of tube 244a. This voltage is obtained by a resistance voltage-divider including a resistor 386, the Vc bias potentiometer 160 and a resistor 388 connected in series between supply leads 314 and 316. The sliding contact on potentiometer 160 is connected through a resistor 390, the lead 378, arm A of relay 60 and the lead 380 to the grid of tube 382. To smooth the circuit operation, a condenser 392 is connected between the junction of resistor 386 and lead 314 and the sliding contact on potentiometer 160.

The cathode of tube 244a is connected to the most negative terminal 392 (3 B⁻4) of supply 239 through lead 291, arm D of relay 60 and its upper contact, a lead 394, a resistor 396, and a lead 398. The cathode of tube 382 is held at a fairly constant voltage with respect to the negative terminal 284 for it is connected through a lead 400 to an intermediate negative terminal 402 (2 B⁻4) of source 239a whose voltage is regulated with respect to terminal 284 by a voltage regulator tube 404. Tube 382 receives its plate voltage through a resistor 406 connected to lead 271 and its screen voltage comes from the junction of resistors 408 and 410 connected in series between lead 271 and lead 400.

In operation, tube 382 controls the grid bias on tube 244a, for its plate is connected to this grid through a lead 412, arm H of relay 60 and lead 322, and responds to fluctuations in voltage between the cathode of tube 244a and the regulated terminal 402. When the output voltage tends to drop, tube 382 conducts less current, raising the grid bias on tube 244a, thus increasing the current through tube 244a, increasing the voltage across the cathode load resistor 396, thus opposing any output change, and vice versa. The result is an effective voltage source impedance of less than five ohms.

The output voltage is adjusted by changing the bias on tube 382 by means of the Vc bias potentiometer 160.

Among the advantages of this circuit is that it makes unnecessary any voltage divider across the controlled output. Thus, the meter 159 can be included within the controlled circuit, providing a low output impedance in spite of the meter's presence and yet enabling accurate measurement of the current fed to the collector because there is no voltage divider to disturb the reading by drawing extra current.

D.C. VOLT METER CIRCUITS

In order to measure the D.C. voltages at the emitter terminal 18 and at the collector terminal 19, the circuits 26 and 28 are used.

Meter circuit 26 includes four pentodes 420, 422, 424, and 426 receiving their plate supply voltages from supply lead 66 and having a common ground connection through the resistor 342. The D.C. voltage on lead 24 is connected to the grid of tube 420, whose plate load resistor 436 is direct coupled through a resistor 438 to the grid of the second tube. This tube is connected with a cathode load including a resistor 428 and fine zeroing resistor 142 and has its grid connected through a resistor 440 to the junction of resistors 342 and 340. The output is fed through a seven-position range switch 430 and through one side of a polarity reversing switch 432 to one side of the meter 434. The other side of meter 434 is connected through the other side of reversing switch 432 and lead 442 to the cathode of the third tube which is connected through coarse adjustment resistor 140 to connection Z at the junction of voltage regulator tubes 144a and 146. The grid of the last tube 426 is connected to connection Z, and its screen and cathode are connected to the same respective electrodes of the first tube 420 whose cathode is connected through a resistor 447 to the junction of resistors 340 and 342. The plate of tube 426 is connected through a resistor 448 to the grid of tube 424 which is connected through a resistor 450 to the junction of resistors 342 and 340.

Changes in the measured D.C. on line 24 cause the voltages of the cathodes of tubes 422 and 424 to vary in opposite directions to produce the meter deflection.

D.C. meter circuit 30 includes a twin triode 452 having one of its grids connected to the collector lead C and the other grid directly connected to base terminal 17 by the lead 124. Both plates are connected through lead 105 to the positive terminal (B+6) of power supply No. 6 having its output stabilized by three series-connected voltage regulator tubes 354, 456 and 458, the junction between tubes 354 and 456 being grounded.

An increase in the D.C. voltage measured increases the current through a voltage divider cathode load circuit including a resistor 460 in series with resistor 462 and resistor 352 connected to the negative terminal (B⁻6) of supply No. 6. This causes current to flow in a lead 464 connected to one side of a seven-position range switch 466, having its arm connected through a reversing switch 468 to meter 162 so that the meter is deflected. The other side of the meter 162 is connected through reversing switch 468 and resistor 470 to the junction of cathode resistors 472 and 474, which is connected through a resistor 475 to the zeroing potentiometer 144b. Resistor 472 is connected through a lead 476 to the other cathode of the dual triode, completing the other side of the meter circuit. The meter is protected from overloads by a dual diode having one half shunted from resistor 472 to the opposite side of the meter from resistor 470. The other half of the diode is shunted from the junction of resistors 474 and 475 across the meter.

We claim:

1. The method of measuring the reciprocal of the emitter conductance of a transistor having at least an emitter, collector, and base electrode comprising the steps of feeding a regulated current of predetermined value through the transistor between its emitter and base electrodes, applying a regulated voltage between the collector and base electrodes, adjusting the value of this regulated voltage effectively to zero to maintain the voltage between these electrodes effectively at zero value, applying a relatively small A.C. signal between the emitter and base electrodes, and measuring the A.C. voltage appearing between the emitter and base electrodes as a result of the application of the small A.C. signal.

2. In a device for testing transistors having at least an emitter, collector and base electrode, apparatus comprising: a source of direct bias current connected between the emitter and base electrodes so as to feed a direct current of predetermined magnitude through the transistor between its emitter and base electrodes, means maintaining substantially zero voltage between the collector and base electrodes, a source of alternating current connected between the emitter electrode and base electrode, so as to feed alternating current through the transistor between the emitter and base electrodes, the magnitude of said alternating current being substantially less than the magnitude of said direct current, and an alternating current voltmeter connected between the emitter and base electrodes for indicating the alternating voltage across the input of the transistor, whereby said voltmeter may be calibrated to read the reciprocal of the emitter conductance.

3. Apparatus for testing a transistor having at least an emitter, collector, and base electrode to determine the $1/g_{11}$, $\gamma$, $1/r_{22}$, and $1-\alpha$ parameters of the transistor comprising: an emitter, collector, and base terminal each adapted to be connected to the respective terminal of the transistor for testing, a common connection, resistor means connected between said base terminal and said common connection, a D.C. regulated current source, means connecting said D.C. current source between the emitter terminal and said common connection, an A.C. signal source, first switch means having a $1/g_{11}$ and $1-\alpha$ condition and adapted when in said condition to connect said A.C. signal source between the emitter terminal and said common connection, an A.C. voltmeter, second switch means having a $1/g_{11}$, $\gamma$, $1/r_{22}$, or $1-\alpha$ condition and adapted when in its $1/g_{11}$ and $\gamma$ condition to connect said A.C. voltmeter between the emitter terminal and said common connection and when in its $1/r_{22}$ and $1-\alpha$ condition to connect said A.C. voltmeter across said resistor means, a shunting connection, third switch means having a $1/g_{11}$ and $\gamma$ condition and adapted when in said condition to shunt said resistor means with said shunting connection, a D.C. regulated voltage source, circuit means connecting said D.C. voltage source between the collector terminal and said common connection, and fourth switch means having a $\gamma$ and $1/r_{22}$ condition and adapted where in said condition to superimpose an A.C. signal on the voltage from said D. C. source.

4. Apparatus for testing a transistor having at least an emitter, collector, and base electrode to determine the $r_{11}$, $r_{12}$, $r_{21}$, $r_{22}$ and $\alpha$ parameters of the transistor comprising: an emitter, collector, and base terminal each adapted to be connected to the respective terminal of the transistor for measurement, a D.C. regulated current source, means connecting said D.C. current source between the emitter and base terminals, an A.C. signal source, first switch means having an $r_{11}$, $r_{12}$, $r_{21}$, $r_{22}$ or $\alpha$ condition and arranged when in its $r_{11}$, $r_{21}$ and $\alpha$ condition to connect said A.C. signal source between the emitter and base terminals and when in its $r_{12}$ and $r_{22}$ condition to connect said A.C. signal source between the collector and base terminals, an A.C. voltmeter, resistor means, circuit means to connect one side of said resistor means to the base terminal, second switch means having an $r_{11}$, $r_{12}$, $r_{21}$, $r_{22}$ or $\alpha$ condition and arranged when in its $r_{11}$ and $r_{12}$ condition to connect said A.C. voltmeter between the emitter and base terminals and when in its $r_{21}$ and $r_{22}$ condition to connect said A.C. voltmeter between the collector and base terminals and when in its $\alpha$ condition to connect said A.C. voltmeter across said resistor means with one side thereof connected to the base terminal, means providing a D.C. regulated current and a D.C. regulated voltage, third switch means having an $r_{11}$, $r_{12}$, $r_{21}$, $r_{22}$ or $\alpha$ condition to connect said means providing a D.C. regulated current between the collector and base terminal and arranged when in its $\alpha$ condition to connect said means providing a D.C. regulated voltage between the collector terminal and the other side of said A.C. voltmeter from that connected to the base terminal, and a control mechanism arranged to operate all of said switch means to corresponding condition.

5. A transistor test circuit for testing a transistor having at least emitter, collector, and base electrodes comprising: emitter, collector, and base terminals adapted to be connected to the respective electrodes of a transistor for testing; a common connection; first resistor means connected between the base terminal and said common connection; first switch means having first, second, and third contacts and a first switch arm associated therewith; second switch means having first, second, and third contacts and a second switch arm associated therewith; a D.C. regulated current source and associated meter connected between said common connection and said first switch arm; an A.C. signal source adapted to be connected from said common connection to either of said switch arms; an A.C. voltmeter adapted to be connected from said common connection to either of said switch arms; a D.C. voltmeter connected between said common connection and said first switch arm; a D.C. voltmeter connected between said common connection and said second switch arm; a D.C. regulated source connected between said common connection and said second switch arm; short-circuit connection means between each of said first contacts and said common connection; second resistor means connected from the second contact of the first switch means to said common connection; third resistor means connected between said second contacts; and fourth resistor means and a switch in series therewith connected across said third resistor means, said third contact of the first switch means being connected to the emitter terminal, said third contact of the second switch being connected to the collector terminal.

6. The method of measuring the reciprocal of the collector to base impedance of a transistor having at least emitter, collector, and base electrodes, comprising the steps of providing a common return circuit, applying a D.C. regulated current between the emitter electrode and said common return circuit, adjusting said regulated current to zero, applying a D.C. regulated bias voltage between the collector electrode and said common return circuit, superimposing on said bias voltage an A.C. voltage of magnitude substantially less than the magnitude of said D.C. bias voltage, connecting the base and common return circuit through a predetermined impedance, and measuring the A.C. voltage appearing across said impedance.

7. The method of measuring the voltage feedback ratio of a transistor having emitter, collector and base electrodes and wherein a voltage applied between the collector and base electrodes generates a voltage between the emitter and base electrodes, due to this feedback ratio comprising the steps of feeding a regulated direct current through the transistor between the emitter and base electrodes, adjusting the value of this regulated current to zero, applying a direct regulated voltage bias of predetermined value between the collector and base electrodes, superimposing an alternating voltage signal of predetermined amplitude on said direct regulated voltage, said predetermined amplitude being relatively small compared to the value of said direct regulated voltage, and measuring the voltage fluctuations appearing between the emitter and base electrodes as a result of said alternating voltage signal, whereby to determine the voltage feedback ratio of the transistor.

8. In a test circuit for a transistor having an emitter and a base and a collector, an alternating current signal source, means including switching means for alternatively connecting said source across said emitter and base and across said collector and base, an amplifier tuned to the frequency of said source, means including said switching means for alternatively connecting said tuned amplifier across said emitter and base and across said collector and base, the arrangement being such that said source and said amplifier are normally connected to the same one of said emitter and collector, said amplifier being adapted to produce an output which is the amplified alternating current voltage at said emitter or at said collector according to the condition of said switching means, a phase discriminating circuit, means connecting said source to said phase discriminating circuit, means for applying said amplifier output to said phase discriminating circuit to cause the latter circuit to produce an output, an alternating current voltmeter and means for applying the phase discriminating circuit output to said voltmeter.

References Cited in the file of this patent

UNITED STATES PATENTS

| | | |
|---|---|---|
| 2,124,577 | Knerr | July 26, 1938 |
| 2,629,078 | Helterline | Feb. 17, 1953 |
| 2,668,272 | Groth | Feb. 2, 1954 |
| 2,669,692 | Pearson | Feb. 16, 1954 |
| 2,677,106 | Haynes | Apr. 27, 1954 |

OTHER REFERENCES

"Principles of Transistor Circuits" by R. F. Shea, pp. 486–496.

Electronics, June 1949, pp 88–89, article by Lehovec.

"Test Techniques for Transistors" by R. P. Turner, Radio Electronics, March 1953, pp 78, 80, 82 and 84.